United States Patent
Chintalachervu et al.

(10) Patent No.: US 7,976,708 B2
(45) Date of Patent: Jul. 12, 2011

(54) INNOVATIVE CUT-AND-FEED OPERATION FOR ENHANCING THE PERFORMANCE OF ION-EXCHANGE CHROMATOGRAPHIC SEPARATION

(75) Inventors: Anand Babu Chintalachervu, Kancheepuram Dt (IN); Bal Krishnan Sharma, Kancheepuram Dt (IN); Mohanankrishnan Gopalswamy, Kancheepuram Dt (IN); Raj Baldev, Kancheepuram Dt (IN)

(73) Assignee: Secretary, Department of Atomrc Energy, Mumbai (IN)

( * ) Notice: Subject to any disclaimer, the term of this patent is extended or adjusted under 35 U.S.C. 154(b) by 0 days.

(21) Appl. No.: 12/747,465

(22) PCT Filed: May 12, 2008

(86) PCT No.: PCT/IN2008/000293
§ 371 (c)(1),
(2), (4) Date: Jun. 10, 2010

(87) PCT Pub. No.: WO2009/138992
PCT Pub. Date: Nov. 19, 2009

(65) Prior Publication Data
US 2010/0278705 A1 Nov. 4, 2010

(51) Int. Cl.
*B01D 15/08* (2006.01)
(52) U.S. Cl. ........ 210/635; 210/638; 210/656; 210/659; 210/198.2; 423/179; 423/179.5; 423/298
(58) Field of Classification Search .................. 210/635, 210/638, 656, 657, 659, 198.2; 423/179, 423/179.5, 298
See application file for complete search history.

(56) References Cited

U.S. PATENT DOCUMENTS

| | | | |
|---|---|---|---|
| 3,701,638 A | 10/1972 | Hagiwara | |
| 3,953,569 A | 4/1976 | Seko et al. | |
| 4,088,553 A | 5/1978 | Rockwood | |
| 4,302,424 A | 11/1981 | Miyake et al. | |
| 4,447,303 A | 5/1984 | Jensen et al. | |
| 4,621,103 A * | 11/1986 | Kosuge et al. | 521/28 |
| 4,775,453 A | 10/1988 | Suzuki et al. | |
| 5,176,885 A * | 1/1993 | Impink et al. | 423/6 |
| 5,419,887 A * | 5/1995 | McCandless et al. | 423/293 |
| 5,439,591 A | 8/1995 | Pliura et al. | |
| 5,443,732 A | 8/1995 | Lahoda et al. | |
| 5,770,083 A | 6/1998 | Ma et al. | |
| 6,086,837 A | 7/2000 | Cowan et al. | |

FOREIGN PATENT DOCUMENTS

| | | |
|---|---|---|
| EP | 0 297 994 | 1/1989 |
| FR | 1 583 034 | 10/1969 |
| GB | 736 459 | 9/1955 |
| GB | 1 247 736 | 9/1971 |
| GB | 1 273 807 | 5/1972 |
| JP | 60-102925 | 6/1985 |
| JP | 60-102947 | 6/1985 |
| JP | 63-028431 | 2/1988 |
| JP | 2-21925 | 1/1990 |
| JP | 2000-237545 | 9/2000 |

* cited by examiner

*Primary Examiner* — Ernest G Therkorn
(74) *Attorney, Agent, or Firm* — Merchant & Gould P.C.

(57) ABSTRACT

The present invention relates to a process of enriching element content in stable isotopes of light elements in ion-exchange chromatography. The process comprises development of band of light elements in a chromatographic column; elution of said band in a discontinuous basis so as to disconnect said chromatographic column at particular stage; and finally the process comprises of regeneration step.

10 Claims, 5 Drawing Sheets

US 7,976,708 B2

INNOVATIVE CUT-AND-FEED OPERATION FOR ENHANCING THE PERFORMANCE OF ION-EXCHANGE CHROMATOGRAPHIC SEPARATION

This application is a National Stage Application of PCT/IN2008/000293, filed May 12, 2008, and which application is incorporated herein by reference. To the extent appropriate, a claim of priority is made is made to each of the above disclosed applications.

FIELD OF THE INVENTION

The present invention is concerned with improved separation of stable isotopes of light elements. More particularly, the present invention relates to an improved separation in discontinuous ion exchange chromatography for significant enhancement of enrichment of stable isotopes of light elements.

BACKGROUND OF THE INVENTION

Separations of very hydrophilic organic compounds using countercurrent chromatography in which a ligand for the analytes of interest is used to enhance the partitioning of the polar species into the organic layer of an aqueous/organic solvent mixture. The compounds are separated according to their affinity for the ligand in the stationary organic phase. This method of affinity countercurrent chromatography can also be conducted in a pH-zone refining mode.

A variety of methods for operating a chromatography system are already reported. Specifically, methods for operating a pumping system within a chromatography system are presented. The methods presented are directed to pumping apparatus in which very small amounts of fluid are pumped through the system. A number of techniques for detecting and compensating for leaks are presented as well as a number of techniques for operating the pumping system.

U.S. Pat. No. 5,443,732 discloses a process and apparatus for the continuous and selective separation of boron-10 from boric acid solution by using a weak base ion exchange resin and water eluant in an annular rotating chromatographic column. It was not known from the prior art that enrichment of elements in light element isotopes can be obtained by discontinuous ion exchange chromatography.

U.S. Pat. No. 4,302,424 discloses an isotope separation apparatus to separate isotopes of uranium, nitrogen, boron, etc by continuously developing the isotope mixture solution passed through the individual adsorbent-packed columns successively in each developing units. However the present invention teaches a process for the improved separation in discontinuous ion exchange chromatography for enrichment of the stable isotopes of light elements. It was not known from the prior art that enrichment of elements in light element isotopes can be obtained by discontinuous ion exchange chromatography.

U.S. Pat. No. 4,447,303 discloses a method of boron isotope enrichment involving the isotope preferential photolysis of (2_chloroethenyl) dichloroborane using $CO_2$ laser radiation and using fluencies significantly below those required to dissociate $BCl_3$. The photo dissociation products react with an appropriate chemical scavenger and the reaction products may readily be separated from undissociated $BCl_3$, thus effecting the desired separation of the boron isotopes. As photolysis is involved yields are low and hence are not economical for industrial scales.

GB736459 discloses an process for enrichment boron isotope by counter current distillation method is used to separate boron isotopes from $BF_3$-DME complex. However the present invention teaches a process for the improved separation in discontinuous ion exchange chromatography for enrichment of the stable isotopes of light elements U.S. Pat. No. 3,953,569 discloses a method of simultaneously obtaining separate enriched fractions of 235 U and 238 U from isotopic mixtures thereof with the use of an ion exchange column. However it was not known from the prior art that enrichment of elements in light element isotopes can be obtained by discontinuous ion exchange chromatography.

U.S. Pat. No. 4,088,553 discloses a method for separating boron isotopes by laser induced selective excitation and photo dissociation of BCl3. Appropriate chemical scavenger reacts with the dissociation product and then it is separated. However the present invention teaches a process for the improved separation in discontinuous ion exchange chromatography for enrichment of the stable isotopes of light elements U.S. Pat. No. 6,086,837 discloses a method of synthesizing enriched decaborane for use in generating boron isotope. It describes a method for synthesizing decaborane wherein at least about 90% of the boron atoms in the decaborane are $^{10}B$ isotope using series of chemical reaction steps. However it was not known from the prior art that enrichment of elements in light element isotopes can be obtained by discontinuous ion exchange chromatography.

JP 2000237545 discloses production of boron isotope separating agent and its use in boron isotopes separation. However the present invention teaches a process for the improved separation in discontinuous ion exchange chromatography for enrichment of the stable isotopes of light elements GB 1273807 discloses a process for the concentration of the stable $^{10}B$ and $^{11}B$ isotopes of boron by countercurrent exchange using an aqueous phase contains boric acid or a complex of boric acid and organic phase contains boric acid or a complex of boric acid with a complex-forming organic compound. It was not known from the prior art that enrichment of elements in light element isotopes can be obtained by discontinuous ion exchange chromatography.

JP2021925 discloses boron Isotopes separation is achieved by a process in which resin bed moving in a downward direction contacts with the upward moving boric acid solution However the present invention teaches a process for the improved separation in discontinuous ion exchange chromatography for enrichment of the stable isotopes of light elements EP0297994 discloses a process for the chromatographic separation, especially of isotopes or ions with the aid of ion exchange resin coatings and suitable resins for the process However the present invention teaches a process for the improved separation in discontinuous ion exchange chromatography for enrichment of the stable isotopes of light elements JP63028431 discloses a process for separation of isotope of boron obtained by selective excitation of boron isotopes by projecting infra red laser to gaseous BBr3 and then reacting chemically with oxygen and the solid powder of oxide obtained is removed. To obtain an effective industrial separating method of $^{10}B$ and $^{11}B$ by adding gas containing oxidative gas as an essential component to gaseous boron tribromide. After selectively exciting or dissociating either $^{10}BBr_3$ or and $^{11}BBr_3$ by projecting infrared (IR) laser to gaseous boron tribromide, it is allowed to chemically react with oxidative gas such as oxygen and nitrogen monoxide and solid powder of oxide or oxybromide is removed from gas resulting in separation of $^{10}B$ and $^{11}B$ isotopes. In this method, gaseous $BBr_3$ is irradiated with IR Laser and made to react with $O_2$ or nitrogen monoxide. However, the yields are low and hence, not possible to use for production at large scales.

JP60102925 This patent deals with the efficient separation of a boron isotope, by using a chelating anion exchange resin having amino polyol as a function group and limiting the concentration. of a boric acid solution to be flowed to a specific range of 0.2-2.0 mol(M)/l while performing treatment at a specific temp range 40-100 deg. C. However the operating temperatures are higher compared to the method mentioned in the patent where operations are carried out at ambient temperatures.

JP60102947 discloses anion exchange resin for separating and concentrating boron isotope. High separation coefficient and high adsorption and desorption rates for boric acid is obtained by using aminopolyol anion exchange resin heated to a specified temperature 60-200 deg. C in a specified medium in a free amine form. However the present invention teaches a process for the improved separation in discontinuous ion exchange chromatography for enrichment of the stable isotopes of light elements U.S. Pat. No. 5,770,083 disclose separation of polar compounds by affinity countercurrent chromatography. Separations of very hydrophilic organic compounds has been achieved using countercurrent chromatography in which a ligand for the analytes of interest is used to enhance the partitioning of the polar species into the organic layer of an aqueous/organic solvent mixture. The compounds are separated according to their affinity for the ligand in the stationary organic phase. This method of affinity countercurrent chromatography can also be conducted in a pH-zone refining mode However the present invention teaches a process for the improved separation in discontinuous ion exchange chromatography for enrichment of the stable isotopes of light elements U.S. Pat. No. 5,439,591 discloses displacement chromatography process. Hemoglobin is purified from a crude solution thereof, to obtain an aqueous solution containing at least 99% of a preselected hemoglobin species, by two stage displacement chromatography process. One of the stages is conducted under anionic exchange conditions, and the other under cationic exchange conditions. In both stages, the exchange column is overloaded to displace the hemoglobin species therefrom with contaminants having greater affinity for the column, and using the impure hemoglobin solution as the displacer. Normally, anionic exchange is conducted first, with contaminants more acidic than the hemoglobin displacing the hemoglobin from the column and themselves remaining attached to the column for separation. The cationic exchange process is conducted second, on the eluent from the first column, and in this stage, the more basic contaminants displace the hemoglobin from the column under overload conditions, to yield a substantially pure hemoglobin solution However the present invention teaches a process for the improved separation in discontinuous ion exchange chromatography for enrichment of the stable isotopes of light elements All the above prior art discloses about the process and apparatus for the continuous and selective separation of $^{10}B$ isotope from a mixture of boron isotopes in a boric acid solution by using a weak base ion exchange resin and water as eluant in a continuous annular chromatograph.

These methods are continuous, steady-state method for separating boron isotopes in aqueous boric acid solutions in which ion exchange column having a sufficient length and width to resolve isotopes of boron, especially the $^{10}B$ and $^{11}B$ isotopes into distinct product fractions is described. An isotope separation apparatus comprising 2 to 20 adsorbent-packed columns forming a continuous developing circuit or passageway is known. The developing units are connected to at least one common main pipe for supplying an isotope mixture solution, a regenerating agent solution, or an eluent solution. Also, in a further embodiment, the developing units are connected to common liquid-discharge main pipes. The separation or concentration of isotopes such as those of uranium, nitrogen, boron etc., is performed by continuously developing the isotope mixture solution after passing through the individual adsorbent-packed columns successively in each developing unit.

These patents as hereinabove describe the basic method of ion exchange chromatography and have a limitation of getting higher enrichment required for Nuclear reactor application without going for cascading.

Thus there is a need to provide a process for improved separation in ion-exchange chromatography with significant enhancement in the enrichment of the stable isotopes of light elements in reduced time frame for use in nuclear reactors.

The present inventors have surprisingly found that by introducing a discontinuous phase in ion exchange chromatography comprising loading of acidic form of light elements such as boron, lithium, nitrogen, oxygen and the like after removal of depletion bands formed in ion exchange chromatography significant enhancement in the enrichment of stable isotopes of light elements can be achieved.

OBJECTS OF THE INVENTION

Accordingly, one object of the present invention is to provide a process for improved separation of stable isotopes of light elements in reduced time frame.

Another object of the present invention is to obtain significant enhancement in the enrichment of stable isotopes of light elements when separation is carried out in discontinuous ion-exchange chromatography.

SUMMARY OF THE INVENTION

The present invention relates to a process for improved separation of stable isotopes of light elements in ion-exchange chromatography for enhancement of enrichment of stable isotopes of light elements, said process steps comprising:
Formation of bands of salts of light elements in chromatographic column; and
Elution of said bands followed by regeneration
wherein in said elution step
I) the chromatographic column is disconnected at an appropriate stage thereafter eluting said bands and
II) fresh natural light element in acidic form is loaded.

DESCRIPTION OF THE INVENTION

The present invention provides an improved separation in discontinuous ion-exchange chromatography in the presence of very low separation factors to enrich stable isotopes of light elements in the range of 50-75%. The said process is applicable for separations of isotopes of elements like Boron, Lithium, Nitrogen, Oxygen etc and the like and purification of liquid solutions. The value of separation factor for separation of stable isotopes is very low varying from 1.001 to 1.01. Separation factor is defined as the ratio of distribution coefficients of two isotopic species involved in the process of separation of stable isotopes. The distribution coefficient is the ratio of concentration of the particular isotopic species in the resin phase to the concentration of the same in aqueous phase in equilibrium with the resin. According to the process, development of light element band in the chromatographic column is the first step. Elution of said band is carried out on discontinuous basis. The column is disconnected at particular stage in the operation and depleted portion has to be eluted out of the column. Natural light element in acidic form is then introduced into the band and further elution is carried out. Regeneration step is the third step in the process. Temperature of the process is maintained between 10° C. and 90° C.

There is increase in the total inventory of stable isotope of light elements in the band when discontinuous ion exchange chromatography is carried out. When the band was moved further by 720 m, the enrichment is marginally increased to 42.9%. When there is no significant enhancement in the enrichment with displacement of said band, it is said to have attained a "plateau" in the enrichment profile with respect to light element enrichment. The process has helped in overcoming the plateau region in the band. Also the rate of enrichment is higher. According to the present invention the said band of the salts of light elements was moved using suitable eluting agent with an optimum band velocities in the range of 5 cm/h to 15 cm/h.

According to a preferred feature of the present invention, the process comprises loading of resin in ion exchange column with natural borate ions as boric acid. The borate band formed inside the column is displaced by hydrochloric acid. During the band movement, the rear end of the borate band is enriched in $^{10}B$ isotope due to its higher exchange affinity compared to $^{11}B$ isotope. The exhausted resin in chloride form is then regenerated to hydroxide form and put back in service to facilitate continuous band movement. The product is eluted out of the band as enriched boric acid solution.

ADVANTAGE

The process of the present invention helps in demonstration of the enrichment of isotopes of boron by ion exchange chromatography in reduced time frame compared to what would have been achieved by operating the plant in conventional manner under steady state conditions. Generally, separation of light elements e.g. boron can be enriched to 65% in $^{10}B$ isotope of boron after 6 years using the resin in particle size range of 0.3 mm to 1.2 mm. Employing the process of the present invention the same enrichment has been achieved in about 4 years.

BRIEF DESCRIPTION OF THE ACCOMPANYING DRAWINGS

DETAILED DESCRIPTION OF THE ACCOMPANYING DRAWINGS

Figure 1:
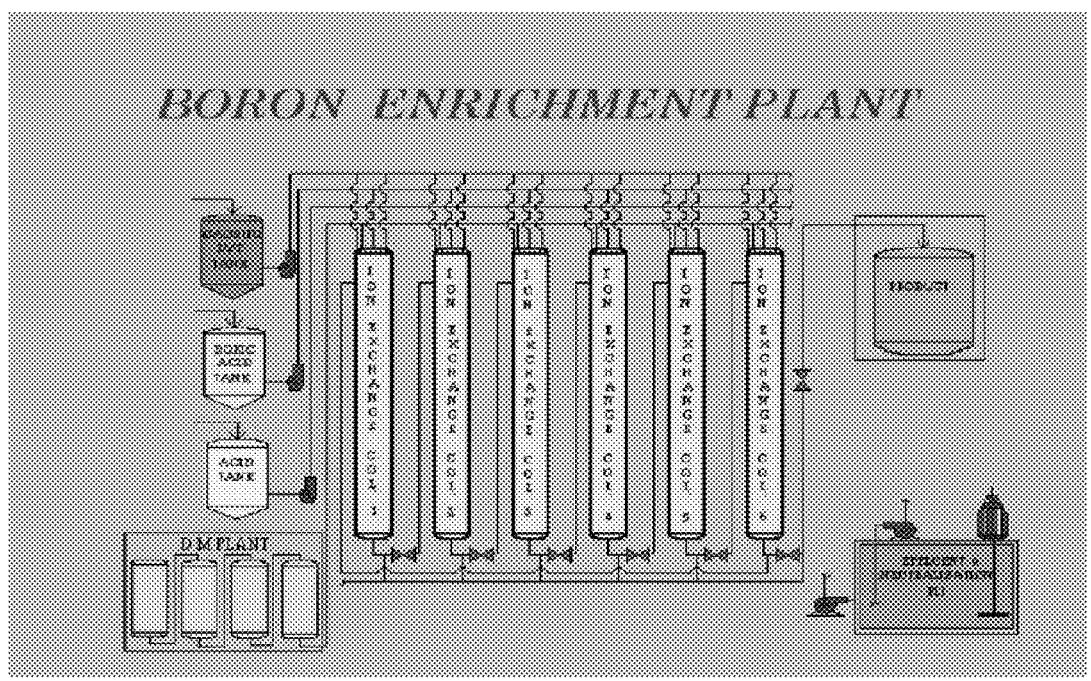
FIG. 1 illustrates a schematic diagram of Boron Enrichment Plant.

FIG. 1 shows the schematic diagram of Boron Enrichment Plant.

Figure 2:
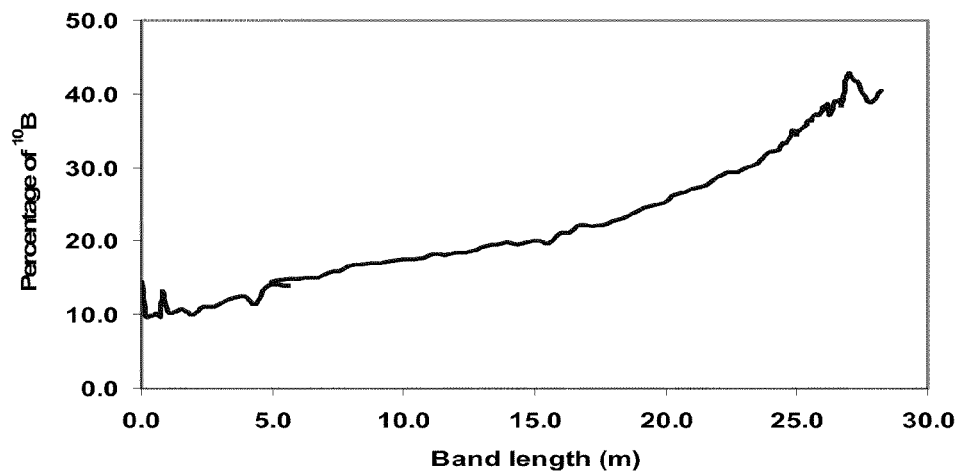
FIG. 2 illustrates an enrichment profile after displacement of the borate band by 430 m

FIG. 2 shows the enrichment profile after displacement of the borate band by 430 m. The plateau was observed in the profile with a maximum value of enrichment in $B^{10}$ to 42.5%.

Figure 3:
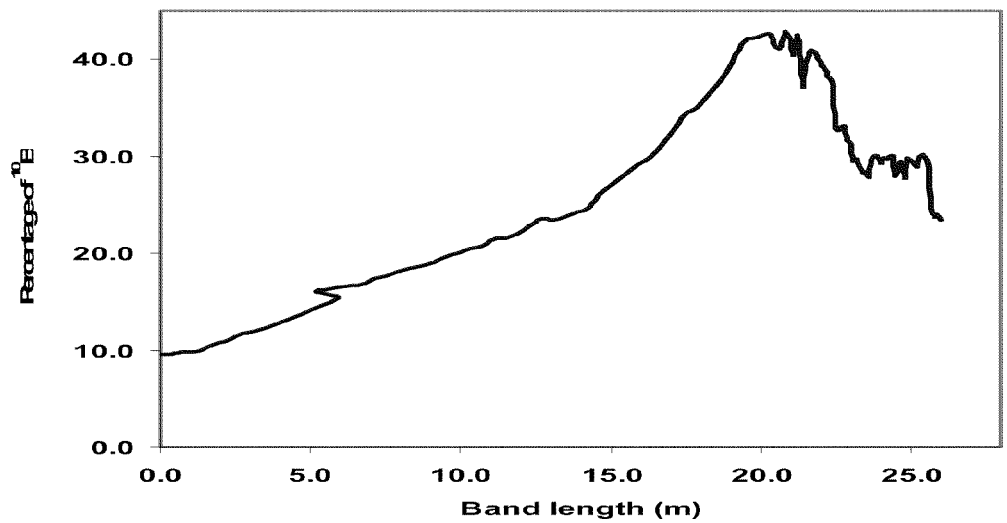
FIG. 3 illustrates an enrichment profile after displacement of the borate band by 502 m.

FIG. 3 describes further displacement of boron band by 720 m, isotopic analysis of the profile samples showed only a marginal increase of 0.4% in $^{10}B$.

Figure 4:
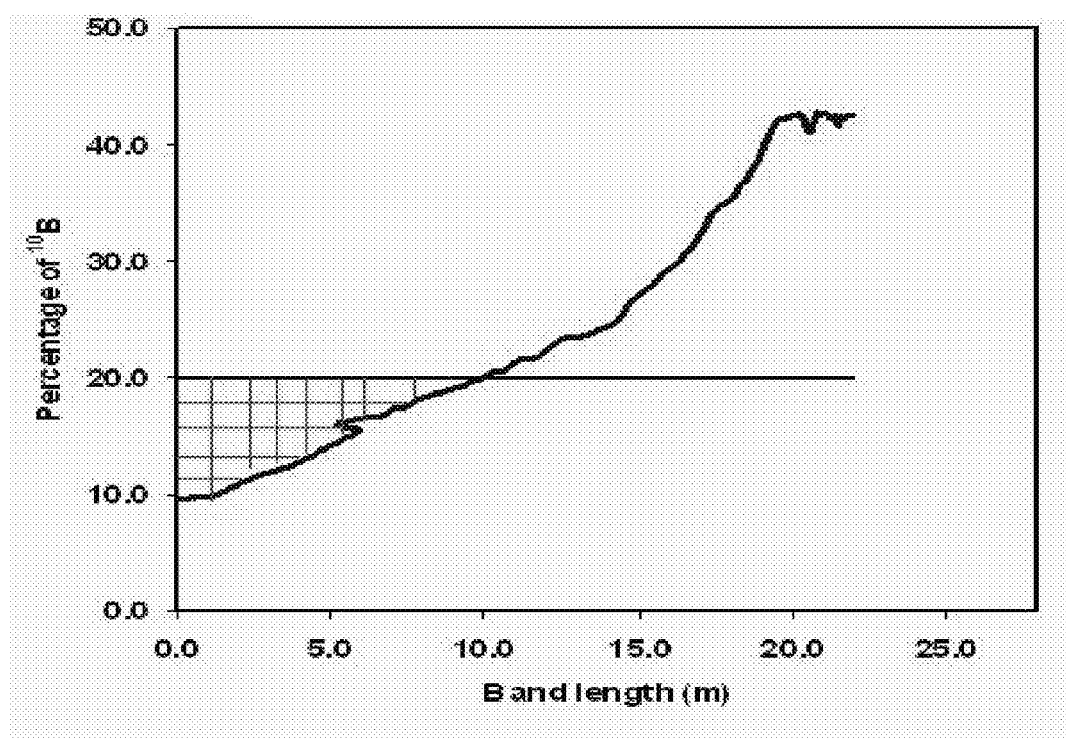
FIG. 4 illustrates an enrichment profile indicating the "Cut and Feed" operation

In FIG. 4 the enrichment profile describes the length of the depleted portion of the band as estimated and the same is replenished with fresh natural boric acid resulting in the increased inventory of $^{10}B$ in the borate band.

Figure 5:
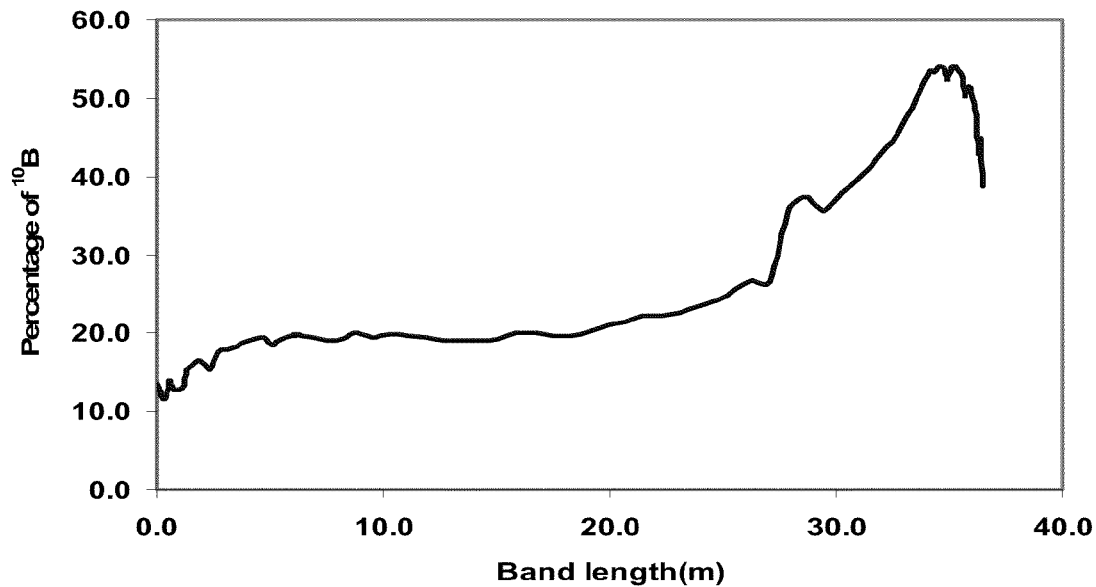
FIG. 5 illustrates an enrichment profile after displacement of the borate band by 720 m.

In FIG. 5 the enrichment profile after displacement of borate band by 720 m shows maximum enrichment of 55%.

Figure 6:
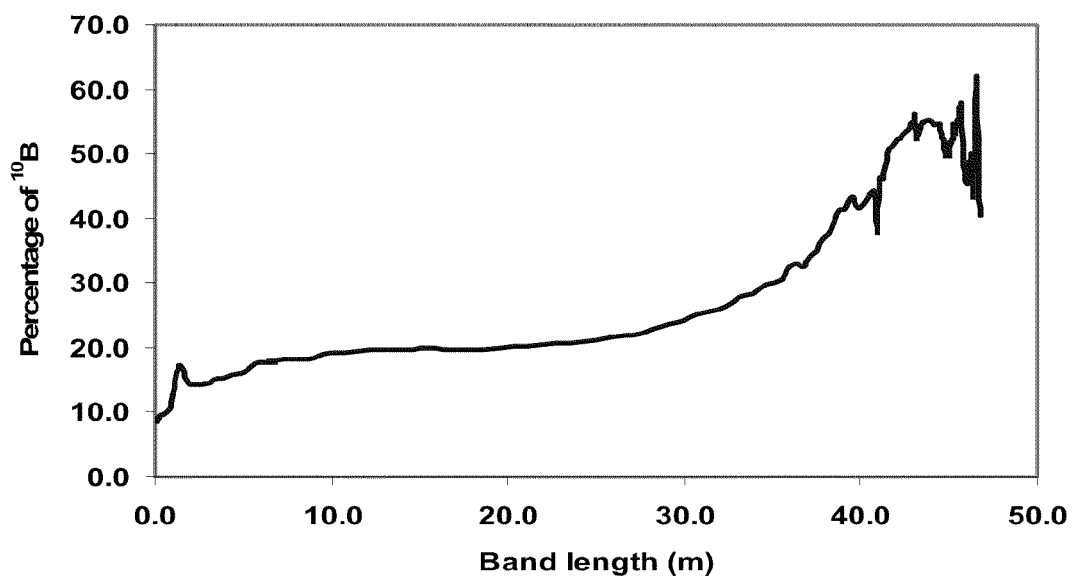
FIG. 6 illustrates an enrichment profile after displacement of the borate band till 65% enrichment is achieved.

In FIG. 6 the enrichment profile after displacement of borate band demonstrates an increase in enrichment till 65%.

Figure 7:
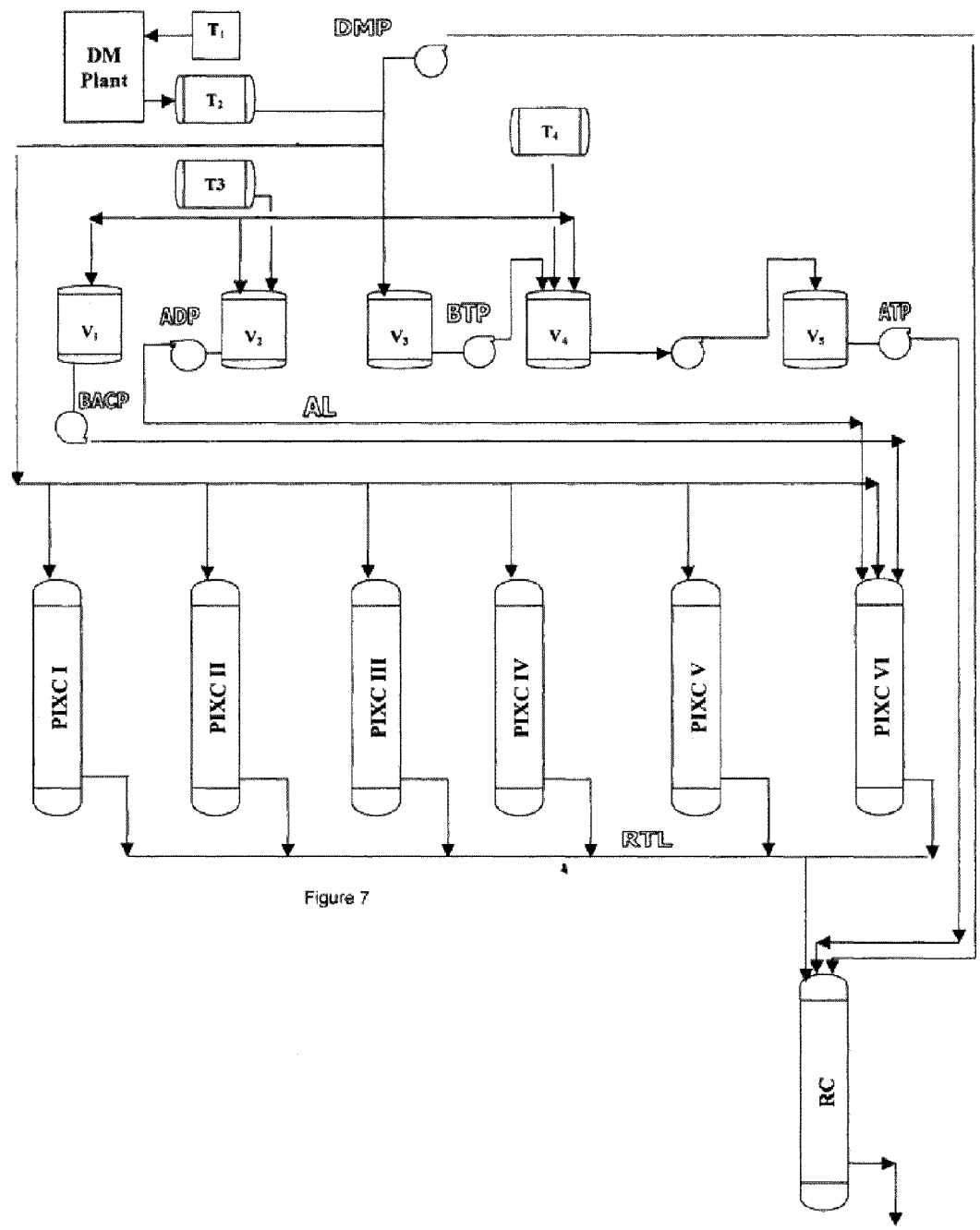
FIG. 7 illustrates the schematic diagram of the process for the separation of stable isotopes of light elements by ion exchange chromatography

In FIG. 7 the process of ion exchange chromatography for the separation of stable isotopes of light elements is described. In this process a strong base/acid anion/cation exchange resin in suitable form is equilibrated with a feed solution containing a mixture of stable isotopes to develop the desired length of the band containing isotopic species. The band is displaced by mineral acid like $H_2SO_4$, $HNO_3$ or HCl using appropriate concentration in the range 0.05M to 0.5M. Once the band containing the mixture of isotopic species is moved out of the column and the concentration of the eluting agent in the effluent is same as that of feed concentration, the column is disconnected from the series of columns for carrying out further operation sequences. The process includes Raw Water Storage Tank ($T_1$), DM Water Storage Tank ($T_2$), HCl Acid Storage Tank ($T_2$), Alkali Storage Tank ($T_4$), Boric Acid Dilution Tank ($V_1$), Acid Dilution Tank ($V_2$), $Ba(OH)_2$ Dilution Tank ($V_3$), Alkali Dilution Tank ($V_4$), Purified Alkali Tank ($V_5$), Process Ion Exchange column (PIXC), Regeneration Column (RC), Neutralization Pit (NP), Resin Transfer Line (RTL), Boric acid Charging pump (BACP), Acid Displacement Pump (ADP), $Ba(OH)_2$ Transfer Pump (BTP), DM Water pump (DMP), Alkali Transfer Pump (ATP), Acid Line (AL) and Boron Enrichment Plant (BEP).

The invention claimed is:

1. A process for improved separation of stable isotopes of light elements in ion-exchange chromatography for enhancement of enrichment of stable isotopes of light elements, said process steps comprising:
   formation of bands of salts of light elements in chromatographic column; and
   elution of said bands followed by regeneration
   wherein in said elution step
   (i) the chromatographic column is disconnected at an appropriate stage thereafter eluting said bands and
   (ii) fresh natural light element in acidic form is loaded.

2. Process as claimed in claim 1 wherein the light elements are selectively boron, lithium, nitrogen, oxygen and the like.

3. Process as claimed in claim 1 wherein velocity of elution of the bands ranges from 5 cm/h to 15 cm/h.

4. Process as claimed in claim 1 wherein enrichment ranges from about 50% to 75%.

5. Process as claimed in claim 1 wherein temperature ranges from about 10° C. to 90° C.

6. Process as claimed in claim 1 wherein the separation factor of the stable isotopes of the light elements ranges from 1.001 to 1.01.

7. Process as claimed in claim 1 preferably comprises loading of resin in ion exchange column.

8. Process as claimed in claim 7, wherein the ion exchange column comprises natural borate ions.

9. Process as claimed in claim 7 further comprising displacement of borate band by hydrochloric acid.

10. Process as claimed in claim 7 wherein rear end of borate band is enriched in $^{10}B$ isotope.

* * * * *

UNITED STATES PATENT AND TRADEMARK OFFICE
CERTIFICATE OF CORRECTION

PATENT NO. : 7,976,708 B2  Page 1 of 1
APPLICATION NO. : 12/747465
DATED : July 12, 2011
INVENTOR(S) : Chintalachervu et al.

It is certified that error appears in the above-identified patent and that said Letters Patent is hereby corrected as shown below:

Title Page;
(73) Assignee: SECRETARY, DEPARTMENT OF ATORMIC ENERGY, MUMBAI (IN)
should be
(73) Assignee: SECRETARY, DEPARTMENT OF ATOMIC ENERGY, MUMBAI (IN)

Signed and Sealed this
Eighteenth Day of October, 2011

David J. Kappos
*Director of the United States Patent and Trademark Office*